(12) United States Patent
Katsurabayashi et al.

(10) Patent No.: US 6,324,518 B1
(45) Date of Patent: Nov. 27, 2001

(54) ELECTRONIC INFORMATION UTILIZATION PROMOTION SYSTEM

(75) Inventors: Hiroshi Katsurabayashi; Eriko Tamaru; Takashi Ohsawa; Shigehiko Sasaki, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/257,183

(22) Filed: Feb. 25, 1999

(30) Foreign Application Priority Data

Mar. 11, 1998 (JP) ................................. 10-059205

(51) Int. Cl.$^7$ ..................................................... G06F 17/60
(52) U.S. Cl. .................................. 705/14; 705/1; 705/26; 705/54; 705/57
(58) Field of Search ................................. 705/14, 54, 57, 705/26, 1; 709/400; 713/167

(56) References Cited

U.S. PATENT DOCUMENTS

| 5,509,074 | * | 4/1996 | Choudhury et al. | 380/23 |
| 5,982,891 | * | 11/1999 | Ginter et al. | 380/4 |

FOREIGN PATENT DOCUMENTS

| 465016 | * | 8/1992 | (EP) . |
| 6-324858 | | 11/1994 | (JP) . |
| 7-74744 | | 3/1995 | (JP) . |

OTHER PUBLICATIONS

Diana George et al, Scan it, pp. 1–12, December 1997.
Hernandez et al, Congress considers updating copyright law to cover online information, pp. 1–2, November 1995.
Muhammed Tarq K, real law in a virtual world, pp. 1–2, December 1996.
Lonkevich Dan, Internet misuse can leave companies exposed, pp. 1–2, August 1996.
Laura Kujubu, SuperComm to detail Bay's more to L2TP, p. 1, June 1998.*
Ken Presti, IBM set for rollout of networking additions, pp. 1–2, March 1997.*

* cited by examiner

Primary Examiner—James P. Trammell
Assistant Examiner—Mussie Tesfamariam
(74) Attorney, Agent, or Firm—Oliff & Berridge, PLC

(57) ABSTRACT

Use right processing for mere viewing and listening of information and utilization right processing for utilization in users' own works can be separately performed, thereby reducing useless right processing in the process of creation and efforts to negotiate singly with an author for right processing. Virtual electronic information manipulation spaces are created on a network and managed by a management part. Information within the spaces is accumulated by an information accumulation part. An information manipulation space control part presents the virtual electronic information manipulation spaces to users while communicating with the management part over the network and obtains information managed by the management part by users' operations. Information in the information manipulation spaces is manipulated by an information manipulation part. When information is transferred out of the information manipulation spaces, right processing is performed by a right processing part.

13 Claims, 20 Drawing Sheets

| SPACE NO. | USER | PASSWORD | MACHINE ADDRESS | UTILIZATION AND REFERENCE TABLE | CONCEPT LIST | SIMILAR WORD LIST | CHARACTERISTIC LIST | RSA MODULO | RSA PUBLIC KEY | RSA PRIVATE KEY |
|---|---|---|---|---|---|---|---|---|---|---|
| 1 | SASAKI | ******* | 129.22 1.23.25 | URT 0001 | IT0001 | ST0001 | FT001 | 12876...347 8283837 | 87293...937 3648 | 45216903468997 ...4569089118 |
| 2 | KATSURABAYASHI | ******* | 129.22 1.24.8 | URT 0002 | IT0002 | ST0002 | FT002 | 317286...34 7888237 | 92854...455 6512565 | 896302165...63 2599694594894 |
| 3 | KUME | ******* | | URT 0003 | IT0003 | ST0003 | FT003 | 8373817.... 73482682 | 23...753246 9852254 | 9480094156.... 1156061593216 |
| 4 | ENDO | ******* | 129.22 1.23.12 | URT 0004 | IT0004 | ST0004 | FT004 | 1828836..3 472837 | 97563...569 83646564 | 5979048..78915 0680958091230 5 |
| 5 | KAGEYAMA | ******* | | URT 0005 | IT0005 | ST0005 | FT005 | 2823786... 47833817 | 123854..58 96355421 | 589298665.....0 8915610106598 9 |

INFORMATION MANIPULATION SPACE MANAGEMENT TABLE OF INFORMATION MANIPULATION SPACE MANAGEMENT UNIT

FIG. 3

| NO. | COPYRIGHT HOLDER NO. | COPYRIGHT HOLDER NAME | COPYRIGHTED MATERIAL NO. | ORIGINAL STORAGE LOCATION | STATUS | UTILIZATION CLASSIFICATION | UTILIZATION LOCATION |
|---|---|---|---|---|---|---|---|
| 1 | 1204 | YUTAKA | 001 | ptp. fuji. co. jp/xxx/graph/001 | REFERENCED | - - - | |
| 2 | 1359 | MAI IZUMI | 002 | ptp. fuji. co. jp/xxx/table/012 | UTILIZED | ALL | 3.5/T06 |
| 3 | 98726 | TOMU | 003 | ptp. fuji. co. jp/xxx/table/102 | REFERENCED | - - - | |
| 4 | 1549 | YURIE | 004 | ptp. fuji. co. jp/xxx/table/058 | REFERENCED | - - - | |
| 5 | 8534 | SATOU | 005 | ptp. fuji. co. jp/xxx/doc/023 | UTILIZED | 2.1/198-365. | 4.2/S12 |
|   |   |   |   |   |   | 2.2/G01 | 4.1/G02 |
|   |   |   |   |   |   | 2.2/T02 | 4.2/T02 |
| 6 | 1657 | KAN | 006 | ptp. fuji. co. jp/xxx/voice/023 | REFERENCED | - - - | |
| 7 | 2487 | KUSU | 007 | ptp. fuji. co. jp/xxx/voice/145 | UTILIZED | ALL | 5.1/M01 |
| 8 | 658 | OOYAMA | 008 | ptp. fuji. co. jp/xxx/pic/568 | UTILIZED | ALL | 5.2/P01 |

OTHERS' COPYRIGHTED MATERIALS MANAGEMENT TABLE OF COPYRIGHTED MATERIAL MANAGEMENT UNIT

FIG. 4

| COPYRIGHTED MATERIAL NO. | ORIGINAL STORAGE LOCATION | PARTIAL UTILIZATION | CONDITION | PRICE |
|---|---|---|---|---|
| 001 | ptp.fuji.co.jp/xxx/graph/001 | NO | | 100 |
| 005-01 | ptp.fuji.co.jp/xxx/doc/023 | 2.1 / CHARACTER | PARTIALLY USABLE (SAME PRICE REGARDLESS OF NUMBER OF CHARACTERS USED) | 10 |
| 005-02 | ptp.fuji.co.jp/xxx/doc/023 | 2.2/G01 | | 40 |
| 005-03 | ptp.fuji.co.jp/xxx/doc/023 | 2.2/T01 | | 100 |
| 005-04 | ptp.fuji.co.jp/xxx/doc/023 | 2.2/T02 | | 100 |
| 006 | ptp.fuji.co.jp/xxx/voice/023 | NO | | 200 |

COPYRIGHTED MATERIAL PRICE TABLE OF RIGHT PROCESSING UNIT

FIG. 5

| COPYRIGHTED MATERIAL NO. | PAYMENT METHOD | TO BE PAID TO: | NAME | TRANSACTION STATUS TABLE |
|---|---|---|---|---|
| 1204 | PROVIDER | N0023659987 | YUJI TANAKA | ACT001 |
| 1359 | PROVIDER | N456987532 | TOSHIYA IMAIZUMI | ACT002 |
| 98726 | BANK | XXXXX OF OO BRANCH OF SSS BANK | YUKI TOMINAGA | ACT003 |
| 1549 | PROVIDER | N459876321 | YURIE SATO | ACT004 |
| 8534 | BANK | XXXXX OF OO BRANCH OF ABCD BANK | EIJI SATO | ACT005 |
|  | PROVIDER | N45989772 | YUJI SUGAWARA | ACT006 |
|  | PROVIDER | N459875236B | HIROSHI KUSUMOTO | ACT007 |
| 1657 | POST OFFICE | XXXXXXXXXXX | OYAMA INC. | ACT008 |

PAYMENT PROCESSING METHOD MANAGEMENT TABLE OF RIGHT PROCESSING UNIT

FIG. 6

CONCEPT LIST 50

| NO. | UPPER CONCEPT | LOWER CONCEPT |
|---|---|---|
| 1 | SPACE | DISCUSSION SPACE |
| | | ELECTRONIC DISCUSSION SPACE |
| | | VIRTUAL DISCUSSION SPACE |
| | | ASYNCHRONOUS DISCUSSION SPACE |
| | | PERSONAL WORK SPACE |
| 2 | MEETING | PRESENTATION - TYPE MEETING |
| | | DISCUSSION - TYPE MEETING |
| | | CONSULTATION |
| 3 | COMPUTER | PERSONAL COMPUTER |
| | | WORKSTATION |
| | | MACINTOSH |
| 4 | PERSONAL WORK SPACE | DESK |
| | | DESKTOP |

FIG. 7

SIMILAR WORD LIST 60

| NO. | TARGET WORD | SIMILAR WORD |
|---|---|---|
| 1 | ICE | INTEGRATED COLLABORATION ENVIRONMENT |
| 2 | PC | PERSONAL COMPUTER |
| 3 | DESKTOP | TABLE TOP |
| 4 | SPEAKER INDEX | BAR CHART |

FIG. 8

CHARACTERISTIC LIST 70

| CHARACTERISTIC | RATIO |
|---|---|
| RATIO OF USE OF COMPUTER - RELATED TECHNICAL TERMS | 30% |
| RATIO OF REFERENCE TO COMPUTER - RELATED PAGES | 37% |
| RATIO OF USE OF SECURITY - RELATED TERMS | 20% |
| RATIO OF REFERENCE TO SECURITY - RELATED PAGES | 31% |
| RATIO OF REFERENCE TO LANDSCAPE PAINTING | 2% |
| AVERAGE NUMBER OF CHARACTER PER SENTENCE | 109 CHARACTERS |

FIG. 9

PROCESSING OF INFORMATION MANIPULATION SPACE MANAGEMENT UNIT

RIGHT PROCESSING

INFORMATION MANIPULATION SPACE MATCHING PROCESSING

PROCESSING OF COPYRIGHTED MATERIAL MANAGEMENT UNIT

PROCESSING OF UTILIZATION TREND EXTRACTION UNIT

PROCESSING OF UTILIZATION AND REFERENCE LIST UNIT

ELECTRONIC INFORMATION UTILIZATION PROMOTION SYSTEM

BACKGROUND OF THE INVENTION

1. Field of the Invention

The present invention relates to an electronic information utilization promotion system designed to, promote further utilization of others' copyrighted electronic information, including manipulations by a computer.

2. Description of the Prior Art

Many apparatuses and methods of managing the amount of software for preventing illegal use of electronic information has been conventionally known. A system which permits the use of software storage media within the range of predetermined provision information is described in Japanese Published Unexamined Patent Application No. Hei 6-324858, for example. This system uses e.g., an IC card as a management medium and permits the use of software only when provision information written there is satisfied.

According to the officially publicized system, illegal use of software can be prevented without impairing spatial convenience with which desired software can be executed by using any of remote computers of the same type.

Also, a method of preventing illegal copying is known in electronic publishing. For example, a method of protecting electronically published documents is described in U.S. Pat. No. 5,509,074. According to this method, for a user's request for a document to a document server, an authentication server authenticates the user and encrypts the requested document using a user's identification number before sending it to the user, and the user decrypts the sent document for utilization.

Also, an information providing system is described in Japanese Published Unexamined Patent Application No. Hei 7-74744. In this system, electronic information is encrypted before being broadcast to an unspecific number of users over communication networks and broadcasting networks, the electronic information and indexes thereof are accumulated in user terminal equipment, only required electronic information is decrypted as requested by the users, and a charge is levied only for the decrypted electronic information.

However, the above-mentioned conventional systems have been problematic in that although right processing for so-called use rights on software use and viewing of electronic documents and images can be performed, the right processing has been too insufficient to further distribute copyrighted electronic information as a new copyrighted material by utilizing (manipulating) it.

By the way, in a present right processing system to perform such right processing for utilization rights, when information to be utilized is obtained through Internet, for example, a charge is generally levied for the utilization right. In this system, a fee is charged even in the case where the information has been utilized (manipulated) with an unsatisfactory result, resulting in discouraging utilization of electronic information.

Such right processing for utilization rights entails a single negotiation with the author of electronic information to be utilized for right processing, bringing about tremendous efforts particularly when a plurality of pieces of electronic information are utilized. This deters further promotion of utilization of electronic information.

SUMMARY OF THE INVENTION

The present invention has been made to solve the above-mentioned problem, and objects of the present invention are to make it possible to separately perform use right processing for mere viewing and listening of information and utilization right processing for utilization in users' works, and to make it possible to perform only use right processing for information being manipulated, without performing utilization right processing until the manipulated information is released, in order to avoid useless right processing in the process of creation and reduce efforts to negotiate singly with an author for right processing.

To achieve the above-mentioned objects, an electronic information utilization promotion system according to claim 1 comprises:

an information manipulation space management part that manages virtual electronic information manipulation spaces created on a network;

an information manipulation space information accumulation part that accumulates information within the virtual electronic information manipulation spaces;

an information manipulation space control part that presents the virtual electronic information manipulation spaces to users while communicating with the information manipulation space management part over the network and obtains information managed by the information manipulation space management part by users' operations;

an information manipulation part that manipulates information in the virtual electronic information manipulation spaces; and a right processing part that performs right processing when information is transferred out of the virtual electronic information manipulation spaces.

According to the invention of claim 2, the electronic information utilization promotion system of claim 1 is characterized in that:

the information manipulation space management part, the information manipulation space information accumulation part, the copyrighted material management part, and the right processing part are included in an information manipulation space server;

the information manipulation space control part and the information manipulation part are included in user terminal equipment; and the information manipulation space server and the user terminal equipment each include a communication part to perform communications over the network.

According to the invention of claim 3, the electronic information utilization promotion system of claim 1 includes:

a copyrighted material management part that manages others' copyrighted materials used for reference or manipulation in the virtual electronic information manipulation spaces, wherein the right processing part references information of the copyrighted material management part to perform right processing when information is transferred out of the virtual electronic information manipulation spaces.

According to the invention of claim 4, the electronic information utilization promotion system of claim 1 includes:

an information manipulation space access right control part that confirms that a user to gain access to the virtual electronic information manipulation spaces is a legitimate user, before permitting the user the access.

According to the invention of claim 5, the electronic information utilization promotion system of claim 2 is characterized in that:

the information manipulation space server includes an encryption part that encrypts information managed by the information manipulation space management part when it is transferred to the information manipulation space control part of the user terminal equipment over the network; and the user terminal equipment includes a decryption part that decrypts information encrypted by the encryption part that is sent from the information manipulation space server.

According to the invention of claim 6, the electronic information utilization promotion system of claim 5 is characterized in that:

the encryption part uses an encryption method which, during encryption, changes an encryption key for each of the virtual electronic information manipulation spaces.

According to the invention of claim 7, the electronic information utilization promotion system of claim 1 includes:

a utilization and reference list part that presents a list of others' copyrighted materials in the virtual electronic information manipulation spaces.

According to the invention of claim 8, the electronic information utilization promotion system of claim 7 is characterized in that:

of the copyrighted materials presented by the utilization and reference list part, those used in manipulated materials are notationally changed in the list so that their locations in the list are identified.

According to the invention of claim 9, the electronic information utilization promotion system of claim 1 includes:

a utilization trend extraction part that extracts the trend of copyrighted materials utilized or referenced previously in the virtual electronic information manipulation spaces; and a similar information search part that searches for similar information based on information extracted by the utilization trend extraction part.

According to the invention of claim 10, the electronic information utilization promotion system of claim 9 includes:

an information manipulation space matching part that introduces users in similar or mutually complementary virtual electronic information manipulation spaces based on the characteristics of each virtual electronic information manipulation space extracted by the utilization trend extraction part.

According to the invention of claim 11, the electronic information utilization promotion system of claim 1 is characterized in that:

partial utilization of a copyrighted material is limited based on previously registered information indicating whether utilization of a selected part of the copyrighted material is permitted.

According to the invention of claim 12, the electronic information utilization promotion system of claim 2 is characterized in that:

the information manipulation part is set for users who are authorized to gain access to the virtual electronic information manipulation spaces by the information manipulation space access control part.

According to the invention of claim 13, the electronic information utilization promotion system of claim 3 is characterized in that:

the information manipulation part is set for users who are authorized to gain access to the virtual electronic information manipulation spaces by the information manipulation space access control part.

Action

In the electronic information utilization promotion system of claim 1 configured as described above, virtual electronic information manipulation spaces are allocated on a network and users can manipulate information within the spaces by the information manipulation part. The right processing part does not perform right processing unless the manipulated information is transferred out of the virtual electronic information manipulation spaces.

That is, information can be freely manipulated if it is within a virtual electronic information manipulation space. The information is accumulated and stored in the information manipulation space information accumulation part.

Therefore, use such as browsing and utilization for manipulation can be separated. In other words, even if information captured in a virtual electronic information manipulation space has been manipulated, so long as the manipulated information is not transferred out of the space, right processing does not occur for utilization for the manipulation, the information being only used.

Hence, if information utilized unsatisfactorily is not transferred out of the space, it virtually yields the same result as when the information has not been utilized, so that problems resulting from the conventional lack of separation of use and utilization are solved.

Since materials produced as a result of manipulation processing are subjected to right processing by the right processing part within the virtual electronic information manipulation space under control of the information manipulation space management part, efforts to negotiate singly with copyright holders can be reduced.

As a result of smooth execution of right processing, further distribution as new copyrighted materials becomes easy, so that utilization of electronic information can be further promoted.

According to the invention of claim 2, the system is configurationally divided into an information manipulation space server and user terminal equipment such that the server is responsible for information management and right processing, and information manipulation can be performed in the user terminal equipment, whereby an ease-of-use system can be built.

The electronic information utilization promotion system of claim 3 includes a copyrighted material management part which manages others' copyrighted materials. Accordingly, use of information of the copyrighted material management part for right processing by the right processing part facilitates the right processing for transfer of manipulated materials out of a virtual electronic information manipulation space.

According to the invention of claim 4, access to a virtual electronic information manipulation space is not permitted until it is determined that the user to gain access to it is a legitimate user having an access right. This helps to prevent materials manipulated in a virtual electronic information manipulation space from being utilized by others without permission.

According to the invention of claim 5, when information is transmitted from the information manipulation space server to the user terminal equipment over a network, utilization of the information can be prevented even if it is stolen in a communication path by persons having no access right.

According to the invention of claim 6, the encryption may be different for each of virtual electronic information manipulation spaces. This provides greater effects for protection against illegal use or utilization.

According to the invention of claim 7, a list of others' copyrighted materials usable in virtual electronic information manipulation spaces can be obtained. This makes it easy for users to decide which copyrighted material to use.

According to the invention of claim 8, copyrighted materials already used in manipulated materials are notationally changed for differentiation from others in the above-mentioned list of others' copyrighted materials. This will facilitate selection of other copyrighted materials for further utilization or the reuse of the same.

According to the invention of claim 9, a user's utilization trend in virtual electronic information manipulation spaces is extracted by the utilization trend extraction part and similar information that is highly likely to be utilized is searched for based on a utilization trend extracted by a similar information search part. This makes it easy for users to obtain information to be utilized.

According to the invention of claim 10, users in similar or mutually complementary virtual electronic information manipulation spaces are introduced based on the characteristics of each virtual electronic information manipulation space, extracted by the utilization trend extraction part. This helps to avoid useless utilization processing such as identical manipulation and achieve efficient information utilization such as integrated utilization processing.

According to the invention of claim 11, since information indicating whether partial utilization is permitted is registered in advance and managed, efficient utilization management including right processing can be achieved.

According to the invention of claim 12, since the information manipulation part is installed in advance in user terminal equipment, utilization in virtual electronic information manipulation spaces is facilitated.

According to the invention of claim 13, the information manipulation part is set for users who are authorized to gain access to the virtual electronic information manipulation spaces by the information manipulation space access control part. This will facilitate proper operation of virtual electronic information manipulation spaces.

BRIEF DESCRIPTION OF THE DRAWINGS

FIG. 3 shows an example of a data structure of an information manipulation space management table of an information manipulation space management unit in the preferred embodiment.

FIG. 4 shows an example of a data structure of an others' copyrighted materials management table of a copyrighted material management unit in the preferred embodiment.

FIG. 5 shows an example of a data structure of a copyrighted material price table of a right processing unit in the preferred embodiment.

FIG. 6 shows an example of a data structure of a payment processing method management table of a right processing unit in the preferred embodiment.

FIG. 7 shows an example of a data structure of a concept list of a utilization trend extraction unit in the preferred embodiment.

FIG. 8 shows an example of a data structure of a similar word list of a utilization trend extraction unit in the preferred embodiment.

FIG. 9 shows an example of a data structure of a characteristic list of a utilization trend extraction unit in the preferred embodiment.

DESCRIPTION OF THE PREFERRED EMBODIMENTS

Hereinafter, the preferred embodiment of an electronic information utilization promotion system of the invention will be described with reference to the accompanying drawings.

Outline of an Electronic Information Utilization Promotion System

Figure 2:
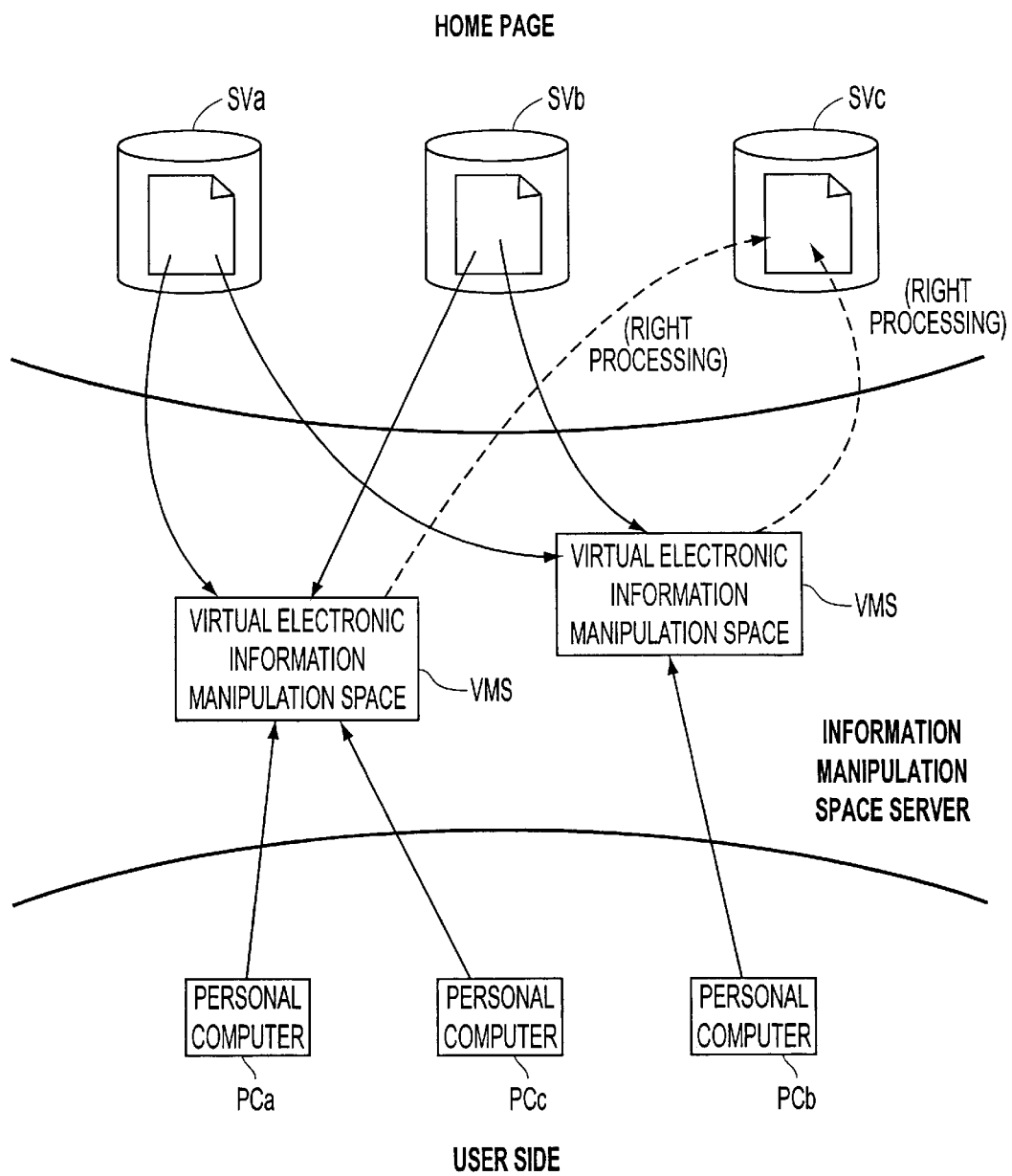
FIG. 2 is a diagram for outlining the whole of the preferred embodiment of the electronic information utilization promotion system in accordance with the present invention.

An outline of a preferred embodiment of the present invention will be given with reference to the conceptual diagram of FIG. 2. In the example of FIG. 2, homepage information of servers SVa, SVb, and so forth on Internet is used and manipulated at personal computers PCa, PCb, and so forth, which are user terminal equipment, to produce new information, which is released to the servers on Internet for further utilization.

Conventionally, as described previously, when personal computers PCa and PCb use homepage information of servers SVa, SVb, and so forth on Internet, the information must be captured within the personal computers over a network.

In this case, right relations must be adjusted to permit utilization (manipulation) of information from the homepages so that the information can be newly released. Accordingly, one possible method is to levy the sum of a use charge and a utilization charge at information acquisition regardless of whether the information is utilized later. Otherwise, when information is to be manipulated for utilization, since right processing must be performed singly with the author of the information, very complicated right processing would be required.

However, this method is an unreasonable accounting method because a utilization fee is also levied on users merely viewing homepages. Furthermore, since this method makes no separation between use such as browsing and utilization such as manipulations, users must pay a utilization fee even when acquired information proves to be not worth utilizing as a result of browsing. This method lacks reasonability in this point also.

Negotiating singly with copyright holders is very troublesome, hampering utilization.

In the embodiment of the present invention, as shown in FIG. 2, virtual electronic information manipulation spaces VMS are assumed to be in a state before users acquire information. The virtual electronic information manipulation spaces VMS are managed by the information manipulation space server and user terminal equipment can freely browse and manipulate information from homepages in the spaces VMS.

However, when information produced in the virtual electronic information manipulation spaces VMS is taken from the spaces VMS as shown by the bold dotted lines in FIG. 2, to store it in e.g., a server SVc on Internet for release, right processing as well as required accounting is performed in the information manipulation space server. That is, users can freely use and utilize information within the virtual electronic information manipulation spaces VMS, and an account occurs when the information is transferred out of the virtual electronic information manipulation spaces VMS.

In the case where an account occurs for use such as the browsing of information from a homepage, when information from the homepage is captured in a virtual electronic information manipulation space VMS, only a use charge such as a browsing charge can be levied separately from a utilization charge. In this case, as described above, a utilization charge is levied when the information is transferred out of the virtual electronic information manipulation space VMS.

In this embodiment, not only can the virtual electronic information manipulation space VMS be used by one user, but also an identical space VMS can be shared by a plurality of users. However, this example provides limitations so that only users having an access right for the virtual electronic information manipulation spaces VMS can utilize one space VMS. As described later, an access right is managed, in this example, by a password set by the first user.

A virtual electronic information manipulation space VMS is allocated by users, and therefore a plurality of virtual electronic information manipulation spaces VMS exist. The information manipulation space server manages the plurality of virtual electronic information manipulation spaces VMS. When there are a plurality of virtual electronic information manipulation spaces VMS in which similar information processing is being performed as manipulation and utilization processing, the fact can be reported to users.

By this arrangement, utilization of electronic information is promoted by providing convenience for users through integration of a plurality of virtual electronic information manipulation spaces VMS in which similar manipulation processing is being performed, and information exchange among them.

In this embodiment, the information manipulation space server managing virtual electronic information manipulation spaces VMS extracts a utilization trend of users of the virtual electronic information manipulation spaces VMS and suggests the existence of information useful to the users. This helps to provide more convenience for the users.

Furthermore, a space section in which a user manipulates information actually exists in a user's terminal, that is, a personal computer although it is within a virtual electronic information manipulation space VMS. Accordingly, electronic information to be manipulated is transferred from a server to the user terminal equipment over a network. If the transferred information could be freely used, the system would collapse.

Accordingly, in this embodiment, information to be transferred to user terminal equipment over a network is encrypted within a virtual electronic information manipulation space VMS, before being transmitted. A part for decrypting the encrypted information is provided within a virtual electronic information manipulation space VMS of user terminal equipment, and encrypted information can be decrypted for utilization within the virtual electronic information manipulation space VMS.

Even within user terminal equipment, when information is to be transferred out of the virtual electronic information manipulation space VMS, the information is encrypted. Since the decryption part does not exist outside the virtual electronic information manipulation space VMS of user terminal equipment, the information cannot be transferred outside as it is.

Figure 1:
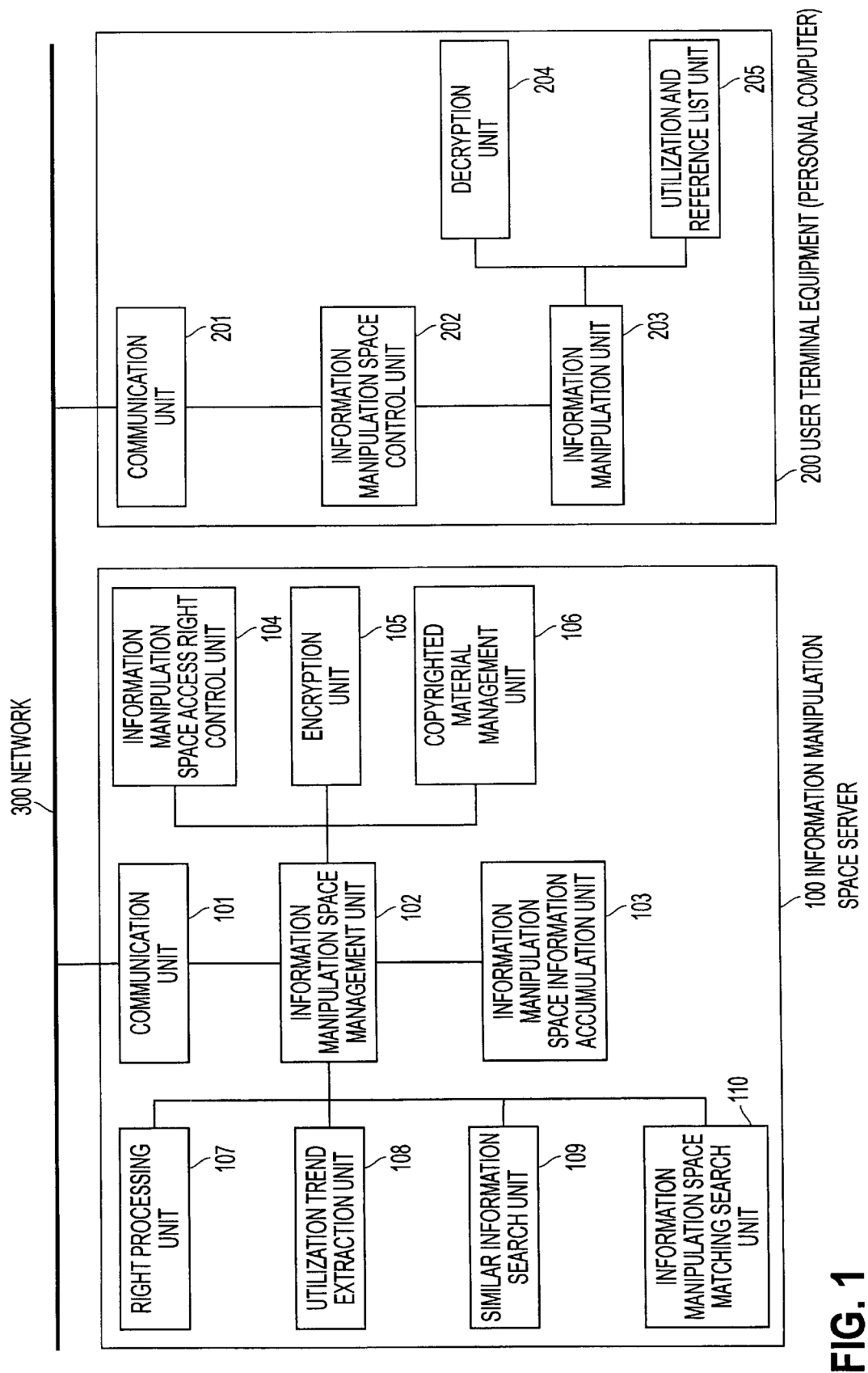
FIG. 1 is a functional block diagram of a preferred embodiment of an electronic information utilization promotion system in accordance with the present invention.

Configuration of an Electronic Information Utilization Promotion System of a Preferred Embodiment FIG. 1 is a block diagram showing the configuration of an embodiment of the present invention. A system is configured in such a way that an information manipulation space server 100 is connected through a network 300 with user terminal equipment 200 comprising a personal computer, for example. The block configurations of the server 100 and terminal equipment 200 in FIG. 1 constitute a functional block diagram, centering on each function within the above-mentioned virtual electronic information manipulation space.

Although only one user terminal equipment 200 comprising a personal computer is shown in FIG. 1 for convenience of space, a plurality of pieces of user terminal equipment 200 are connected to one information manipulation space server 100 over a network 300. The network is e.g. Internet or the like, and the information manipulation space server 100 and user terminal equipment 200 are connected to other computers and servers holding homepages over the network 300.

The information manipulation space server 100 includes a communication unit 101, an information manipulation space management unit 102, an information manipulation space information accumulation unit 103, an information manipulation space access right control unit 104, an encryption unit 105, a copyrighted material management unit 106, a right processing unit 107, a utilization trend extraction unit 108, a similar information search unit 109, and an information manipulation space matching search unit 110.

The user terminal equipment (personal computer) 200 includes a communication unit 201, an information manipulation space control unit 202, an information manipulation unit 203, a decryption unit 204, and a utilization and reference list unit 205.

In this embodiment, the software programs of the information manipulation space control unit 202, information manipulation unit 203, decryption unit 204, and utilization and reference list unit 205 are installed in advance in the personal computer.

The communication units 101 and 201 communicate with each other to exchange data and the like over the network 300. The communication units 101 and 201 may be connected to Ethernet, networks configured with telephone lines, or buses inside a computer. Also, they may be connected with other computers through serial ports such as RS232C, parallel ports, and infrared rays.

The information manipulation space management unit 102, which operates on an information manipulation space server, manages information about spaces making up virtual electronic information manipulation spaces VMS built on a network, users of the spaces, encryption keys specific to the spaces, information used on the virtual electronic information manipulation spaces VMS, and the like.

FIG. 3 shows an example of an information manipulation space VMS management table 10 of the information manipulation space management unit 102. In this table, the "space No." record contains identification numbers assigned to virtual electronic information manipulation spaces VMS. The "password" record, set by a user to authenticate a right of access to a virtual electronic information manipulation space VMS, is provided to permit the user to gain access to the virtual electronic information manipulation space VMS of a space No. specified together with the password. The access right processing is performed in the information manipulation space access right control unit 204 as described later.

The "machine address" record indicates a network address of a user's personal computer.

The "utilization and reference table" record is used to identify a list table of information items used or referenced by users. "Concept list", "similar word list", and "characteristic list" records are reference indexes to lists provided by the utilization trend extraction unit 108.

The "IRSA modulo", "RSA public key", and "IRSA private key" records present information used in an RSA encryption system used in the encryption unit 105. In this embodiment, since different encryption is applied to information for each user, different RSA modulo, RSA public key, and RSA private key are provided for each user. When the information manipulation space VMS is reused, an encryption key is updated as required, and each time it is updated, the "IRSA modulo", "RSA public key", and "RSA private key" records of the management table 10 are also updated.

The information processing space information accumulation unit 103, for each space number, accumulates information managed in the virtual electronic information manipulation space VMS. Reading and writing information from and to the information processing space information accumulation unit 103 is controlled and managed by the information manipulation space management unit 102.

The information manipulation space access right control unit 104 determines whether a user to gain access to a virtual electronic information manipulation space VMS is a legitimate user, from a password recorded in the above-described information manipulation space management table 10 of the information manipulation space management unit 102. Only for legitimate users, access to the virtual electronic information manipulation space VMS to which access is requested is permitted.

When copyrighted electronic information is to be transferred from a virtual electronic information manipulation space VMS to the information manipulation unit 203 of the user terminal equipment 200, the encryption unit 105 encrypts the electronic information in order that it cannot be used even if it is stolen in a communication route or the like by a person not having an access right.

The copyrighted material management unit 106 manages others' copyrighted materials that are captured into and utilized in materials (hereinafter referred to as manipulated materials) produced as a result of users manipulating information in the information manipulation unit 203 of the user terminal equipment 200.

FIG. 4 shows an example of an others' copyrighted material management table 20.

In this management table 20, the "copyright holder No." record contains identification information of copyright holders. The copyright holder name record contains the names of copyright holders, which are used as text data. The "copyrighted material No." record contains identification information of copyrighted materials. The "original storage location" record contains the network addresses of locations where copyrighted materials are stored.

The "status" record indicates the utilization status of a relevant copyrighted material. In this embodiment, copyrighted materials referenced but not used in manipulated materials are marked "Referenced" in the status record and copyrighted materials used in manipulated materials are marked "Utilized" in the status record.

The "utilization classification" record contains a utilization range of copyrighted materials. For example, if all of a copyrighted material is used, the utilization classification record is marked "All", and if partially utilized, the logical structure identifier of a portion utilized is recorded. The logical structure identifier "2.1/198-365" of the example of FIG. 4 denotes from a 198th character position in the first section of Chapter 2 to a 365th character position. The logical structure identifier "2.2/G01" denotes FIG. 1 in the second section of Chapter 2.

On detecting that a product produced in the information manipulation space 203 is to be transferred out of a virtual information manipulation space VMS, the right processing unit 107 performs right processing for a copyrighted material used in a final manipulated material.

FIG. 5 shows an example of a data structure of a copyrighted material price table 30 of the right processing unit 107. In FIG. 5, the "partial utilization" record, in the case of this example, indicates whether partial utilization such as partial copying is permitted, and which part to permit for utilization if permitted.

In the example of FIG. 5, copyrighted material numbers 001 and 006 cannot be partially utilized. In this case, the price record contains a price for whole utilization. Other copyrighted materials can be partially utilized and utilizable ranges are recorded. For example, "2.1/character" denotes that characters in the first section of Chapter 2 can be partially utilized. "2.1/G01" denotes that only FIG. 1 in the first section of Chapter 2 can be partially utilized. "2.1/T01" denotes that only Table 1 in the first section of Chapter 2 can be partially utilized.

Furthermore, the "condition" record contains a condition on partial utilization. In the case of the example in FIG. 5, the price is constant even if any number of characters in the "first section of Chapter 2" of the "copyrighted material number 005-01" are utilized.

The right processing unit 107 computes the price of copyrighted materials using the copyrighted material price table 30 in FIG. 5 to bill the users.

The right processing unit 107 has a payment processing method management table 40 to present a method of paying a price to users. FIG. 6 shows an example of a data structure of the payment processing method management table 40 in the right processing unit 107.

The utilization trend extraction unit 108, from relationships among words used in manipulated materials, creates a concept list, a similar word list, and the like, and identifies the fields of manipulated materials from the occurrence frequency of words used. The utilization trend extraction unit 108 analyzes a reference trend, the fields of manipulated materials, and a utilization trend of others' copyrighted materials from referenced others' copyrighted materials and used others' copyrighted materials.

To obtain a utilization trend of others' copyrighted materials, upper concepts and lower concepts of words used in virtual electronic information manipulation spaces VMS are extracted to create a concept list. The utilization trend extraction unit 108 extracts words similar to those used in virtual electronic information manipulation spaces VMS to create a similar word list. Furthermore, the utilization trend extraction unit 108 creates a characteristic list indicating the fields of manipulated materials in which technical terms are used.

FIG. 7 shows an example of a data structure of a concept list 50 of the utilization trend extraction unit 108. FIG. 8 shows an example of a data structure of a similar word list 60 of the utilization trend extraction unit 108. Furthermore, FIG. 9 shows an example of a data structure of a characteristic list 70 of the utilization trend extraction unit 108.

The similar information search unit 109 searches for homepages on a Web server on Internet, for example, based on a utilization trend of user information in virtual electronic information manipulation spaces VMS, extracted by the utilization trend extraction unit 108, and presents similarity information to users. This aims at providing convenience for users and promoting utilization of information by presenting to the users information that is highly likely to be utilized by the users.

The information manipulation space matching search unit 110 searches for virtual electronic information manipulation spaces VMS having similar characteristics, based on a utilization trend of user information in virtual electronic information manipulation spaces extracted by the utilization trend extraction unit 108, and tells both users of the similar spaces VMS the existence thereof. By this process, a waste of performing the same manipulation processing is made known and users having the same purpose can integrate the virtual electronic information manipulation spaces VMS to perform the manipulation processing in collaboration.

Next, a description will be made of the configuration of the user terminal equipment 200 within virtual electronic information manipulation spaces VMS.

The information manipulation space control unit 202 connected through the communication unit 201 communicates with the information manipulation space management unit 102 of the information manipulation space server 100 in a personal computer used by a user, and provides virtual electronic information manipulation spaces VMS to the user.

The information manipulation unit 203, which receives information from the information manipulation space control unit 202, is used by the user to perform information manipulations such as copying and addition.

The decryption unit 204 decrypts information encrypted by the encryption unit 105 that is sent by the information manipulation space management unit 202. The information manipulation unit 203 sends information received from the information manipulation space control unit 202 to the decryption unit 204. The decryption unit 204 decrypts the information using encryption key information stored in it and returns the decrypted information to the information manipulation unit 203. By this process, the user can perform manipulation processing in the virtual electronic information manipulation spaces VMS in the information manipulation unit 203.

The utilization and reference list unit 205 provides a list of others' copyrighted materials referenced in virtual electronic information manipulation spaces VMS and others' copyrighted materials captured in created materials, highlights portions referenced again or used in manipulated materials by users optionally selecting the others' copyrighted materials, and shows use locations by switching a display to the pages being used.

Operation of Each Part of a System of the Embodiment

The flow of processing of each part in an electronic information utilization promotion system thus configured will be described below with reference to the accompanying flowcharts.

In this system, various requests are issued to the network 300 from the information manipulation space control unit 202 of user terminal equipment 200 through the communication unit 201, the information manipulation space management unit 102 of the information manipulation space server 100 receives the requests through the communication unit 101 and has each part perform processing corresponding to the requests, and sends necessary replies and information to the user terminal equipment 100 over the network 300. In the course of the above-mentioned exchange of requests and replies between the information manipulation space control unit 202 and the information manipulation space management unit 102, various processing described below is performed in virtual electronic information manipulation spaces VMS.

Figure 10:
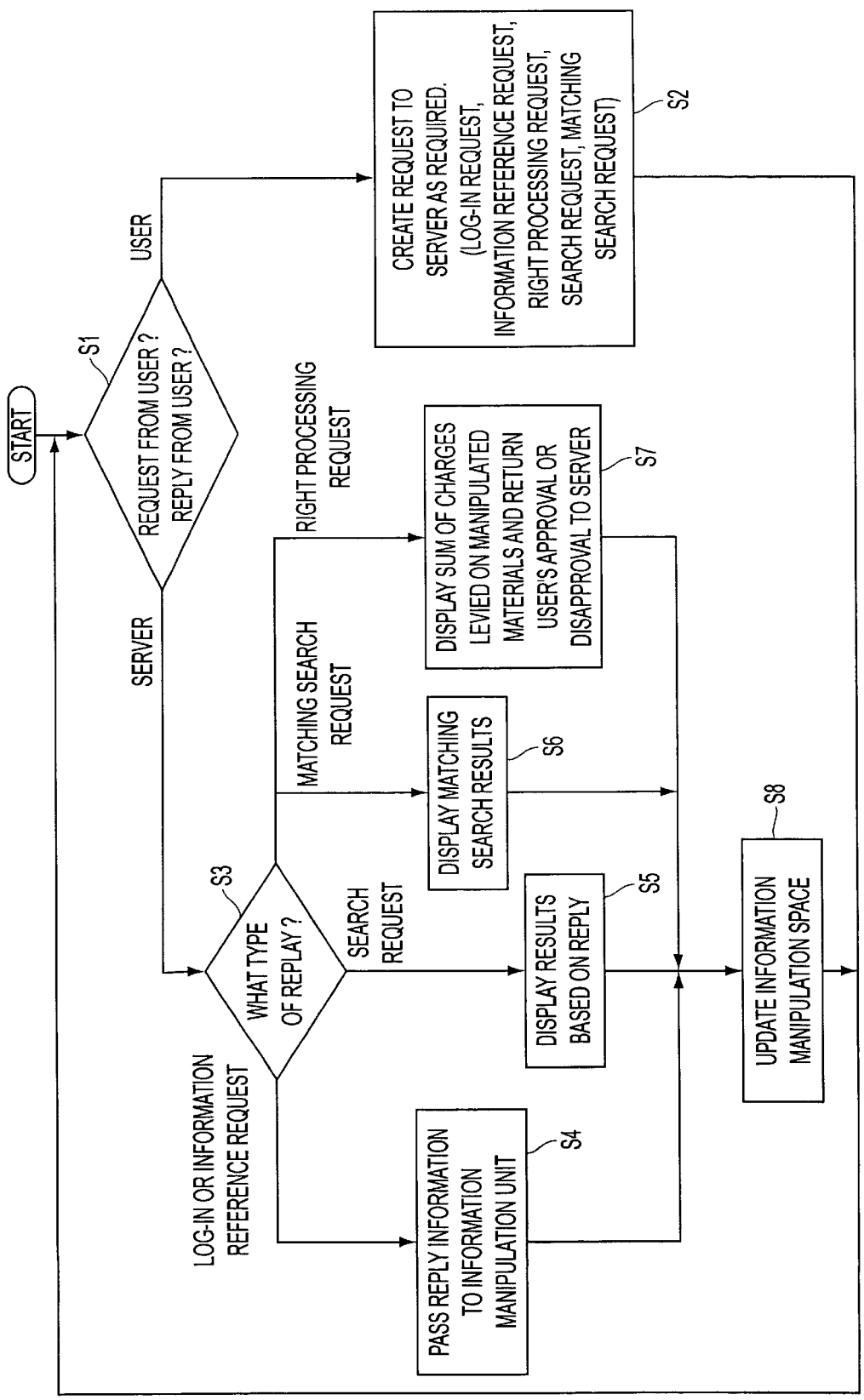
FIG. 10 is a flowchart showing the flow of processing of an information manipulation space control unit in the preferred embodiment.

FIG. 10 is a flowchart showing the flow of processing of the information manipulation space control unit 202 of the user terminal equipment 200. That is, the information manipulation space control unit 202, in step S1, checks whether a request has been inputted from a user, or a reply has been received from the information manipulation space server 100.

On input of a request from a user, control proceeds from step S1 to step S2, which generates request information to the server 100, corresponding to the request. In this embodiment, the following five requests are enabled:

(1) request for log-in to virtual electronic information manipulation spaces (2) request to reference information in virtual electronic information manipulation spaces (3) right processing request for transferring information out of virtual electronic information manipulation spaces (4) request to search for information to be used for manipulation processing in virtual electronic information manipulation spaces
(5) matching search request for determining whether similar processing is performed in other virtual electronic information manipulation spaces Control returns to step S1 after step S2.

When it is determined in step S1 that a reply from the server 100 has been received, control proceeds to step S3, which determines to which request the reply is made.

When the reply is made to a log-in request or an information reference request, since it contains information of an information manipulation space or information requested for reference, control proceeds to step S4, which passes the reply information to the information manipulation unit 203. The information has been encrypted on a user-by-user basis.

When it is determined in step S3 that the reply is made to a search request, control proceeds to step S5, which displays results based on the reply and reports them to the user.

When it is determined in step S3 that the reply is made to a matching search, control proceeds to step S6, which displays and reports the results of the matching search to the user.

When it is determined in step S3 that the reply is made to a right processing request, control proceeds to step S7. Since the reply contains the sum of charges for manipulated materials as a result of right processing, the sum is presented to the user and the user's approval or disapproval for it is returned to the server 100.

After steps S4, S5, S6, and S7, control returns to step S1 to repeat the above processing steps.

Figure 11:
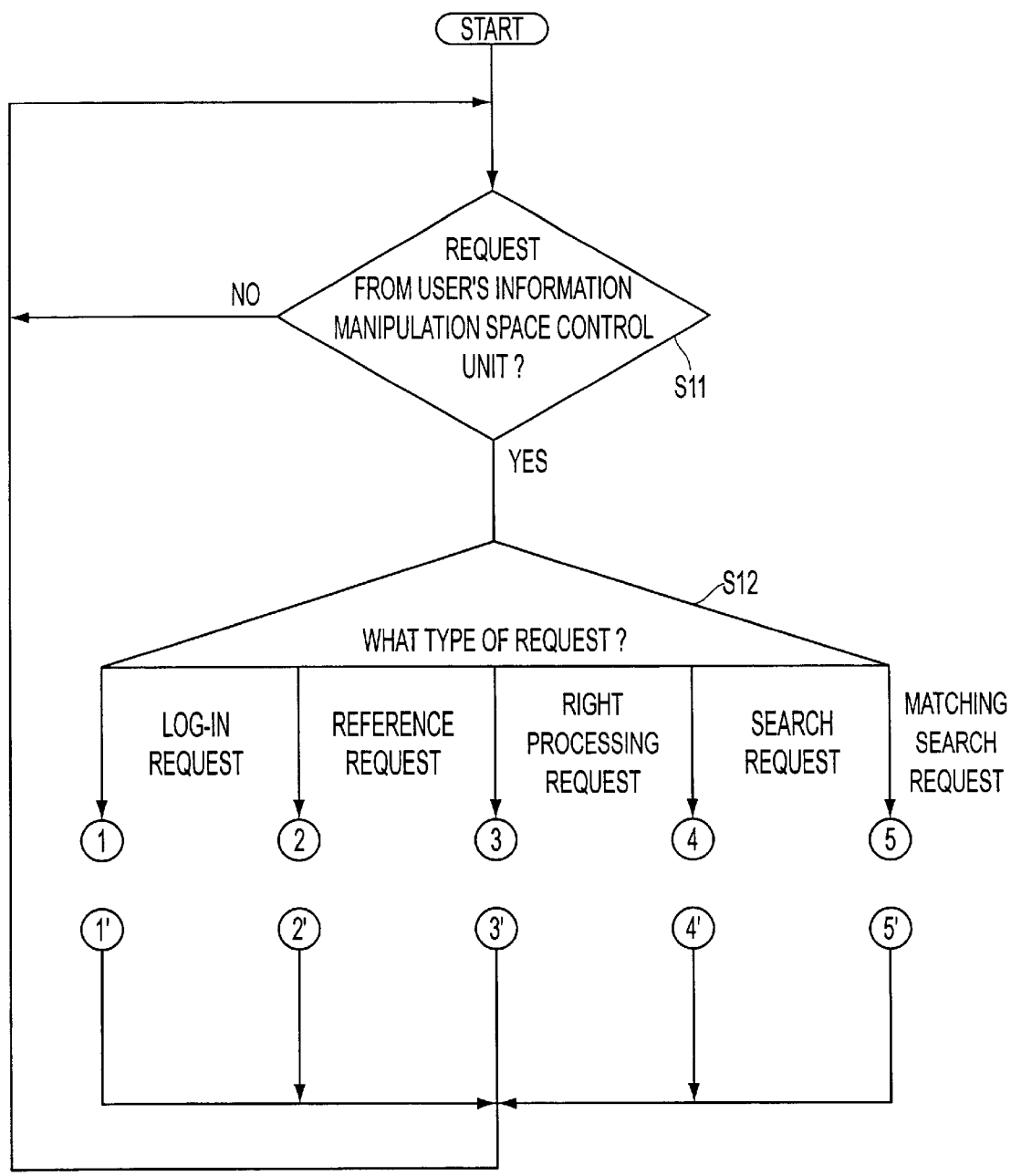
FIG. 11 is a flowchart showing the flow of processing of an information manipulation space management unit in the preferred embodiment.

FIG. 11 is a flowchart showing a control flow of processing of the information manipulation space management unit 102.

The information manipulation space management unit 102, in step S11, waits for a request sent from the information manipulation space control unit 202 of the user terminal equipment 200 over the network 300, and on detecting a request's arrival, determines the kind of the request, in step S12.

Figure 12:
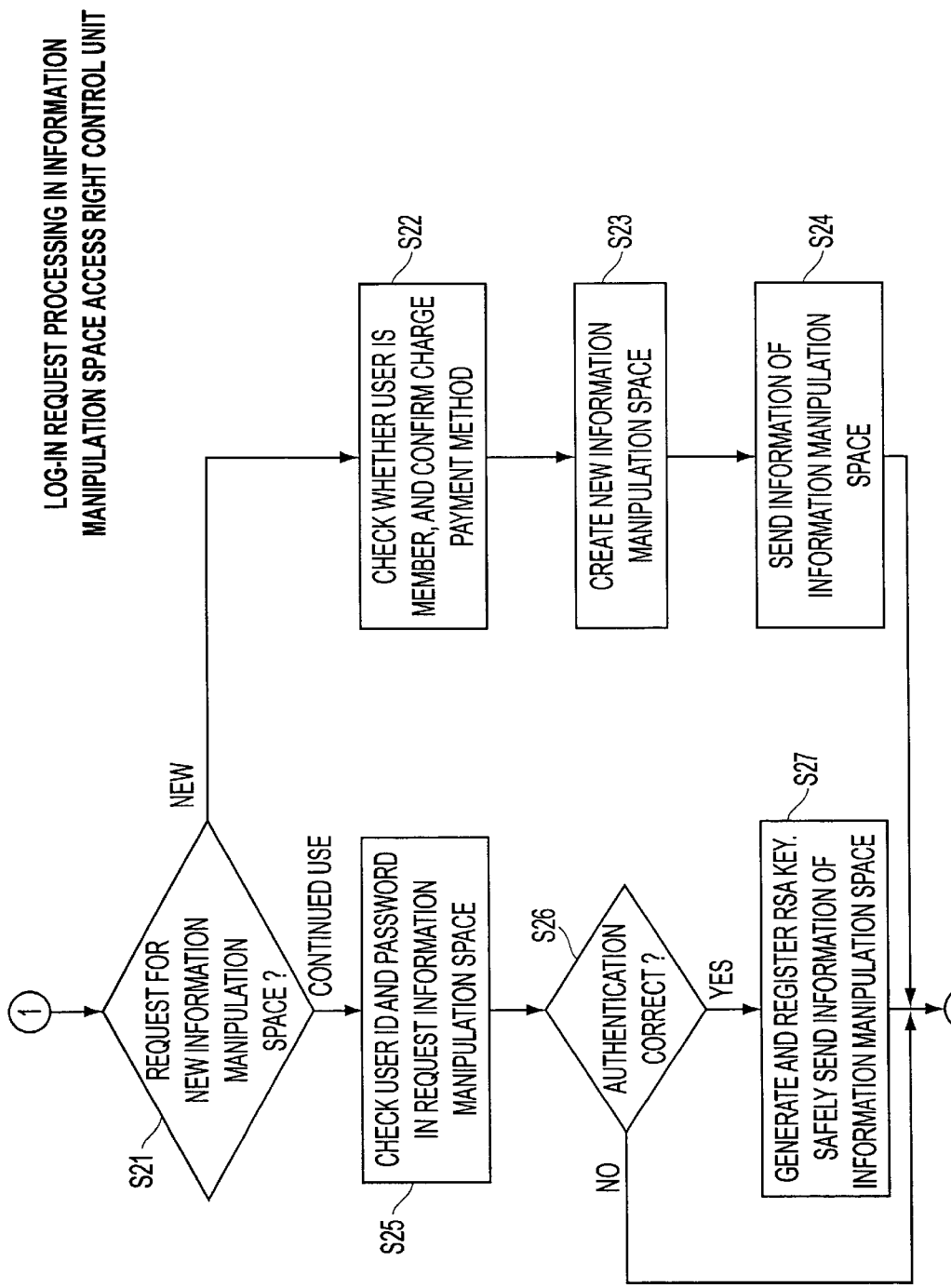
FIG. 12 is a flowchart showing the flow of processing of an information manipulation space access right control unit in the preferred embodiment.

When the request is that for log-in to virtual electronic information manipulation spaces VMS, it is passed to the information manipulation space access right control unit 104 to perform processing for the request as shown in FIG. 12 to be described later. Upon receipt of the result, a necessary reply is sent to the information manipulation space control unit 202 of the user terminal equipment 200 through the communication unit 101 and the network 300. Then, control returns to step S11 which is waiting for a request.

Figure 13:
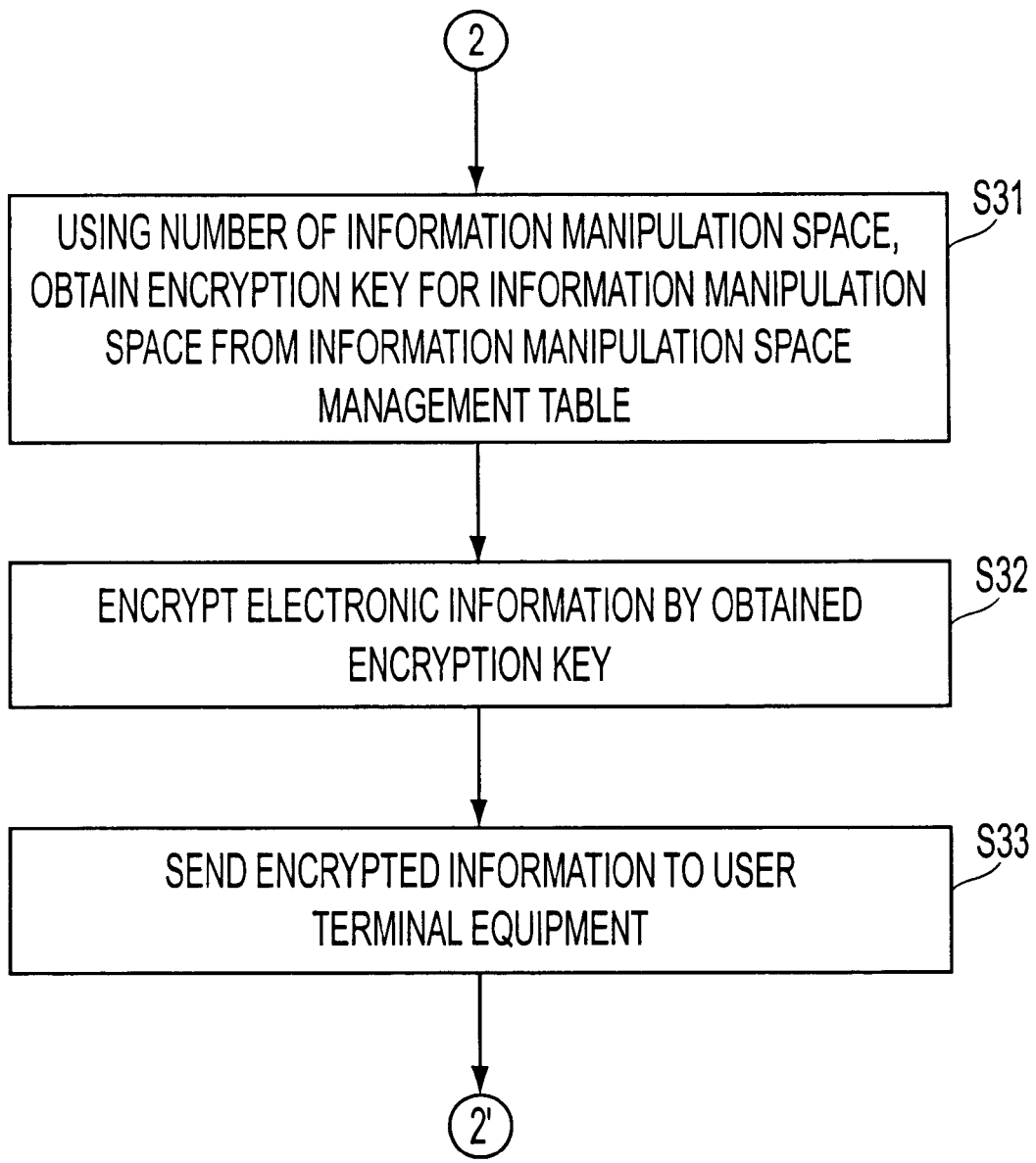
FIG. 13 is a flowchart showing the flow of processing of an encryption unit in the preferred embodiment.

When the request is an information reference request, requested information is obtained from the information manipulation space information accumulation unit 103 or other servers over the network if required, the obtained information is sent to the encryption unit 105 to encrypt the requested information as shown in FIG. 13 to be described later, and encrypted information is sent to the information manipulation space control unit 202 of the user terminal equipment 200 through the communication unit 101 and the network 300. Then, control returns to step S11 which is waiting for a request.

Figure 14:
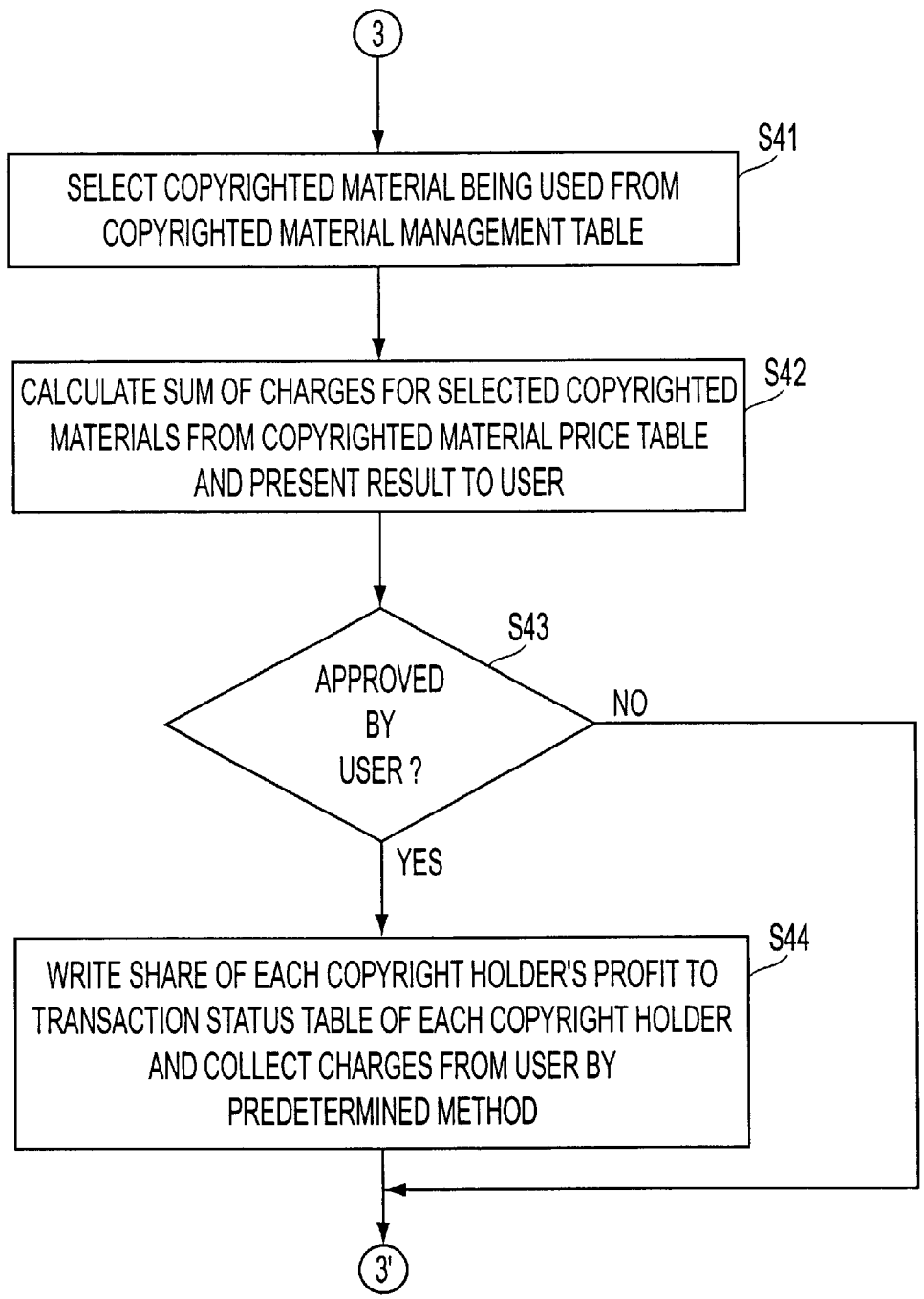
FIG. 14 is a flowchart showing the flow of processing of a right processing unit in the preferred embodiment.

When the request is a right processing request, the request is passed to the right processing unit 107 to perform right processing as shown in FIG. 14 to be described later. Then, control returns to step S11 which is waiting for a request.

Figure 15:
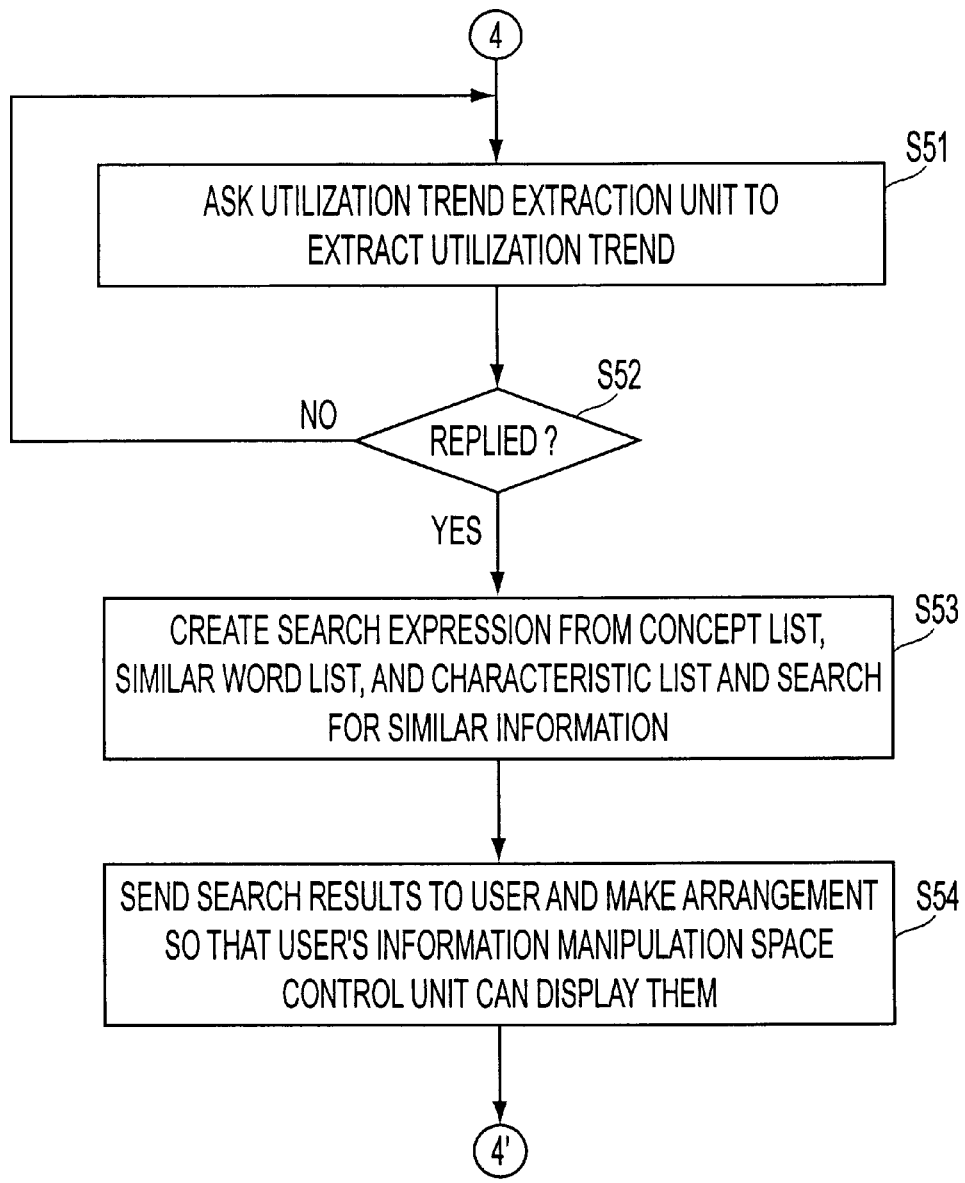
FIG. 15 is a flowchart showing the flow of processing of a similar information search unit in the preferred embodiment.

When the request is a search request, the similar information search unit 109 is instructed to search for similar information as shown in FIG. 15 to be described later, and search results are sent to the information manipulation space control unit 202 of the user terminal equipment 200 through the communication unit 101 and the network 300. Then, control returns to step S11 which is waiting for a request.

Figure 16:
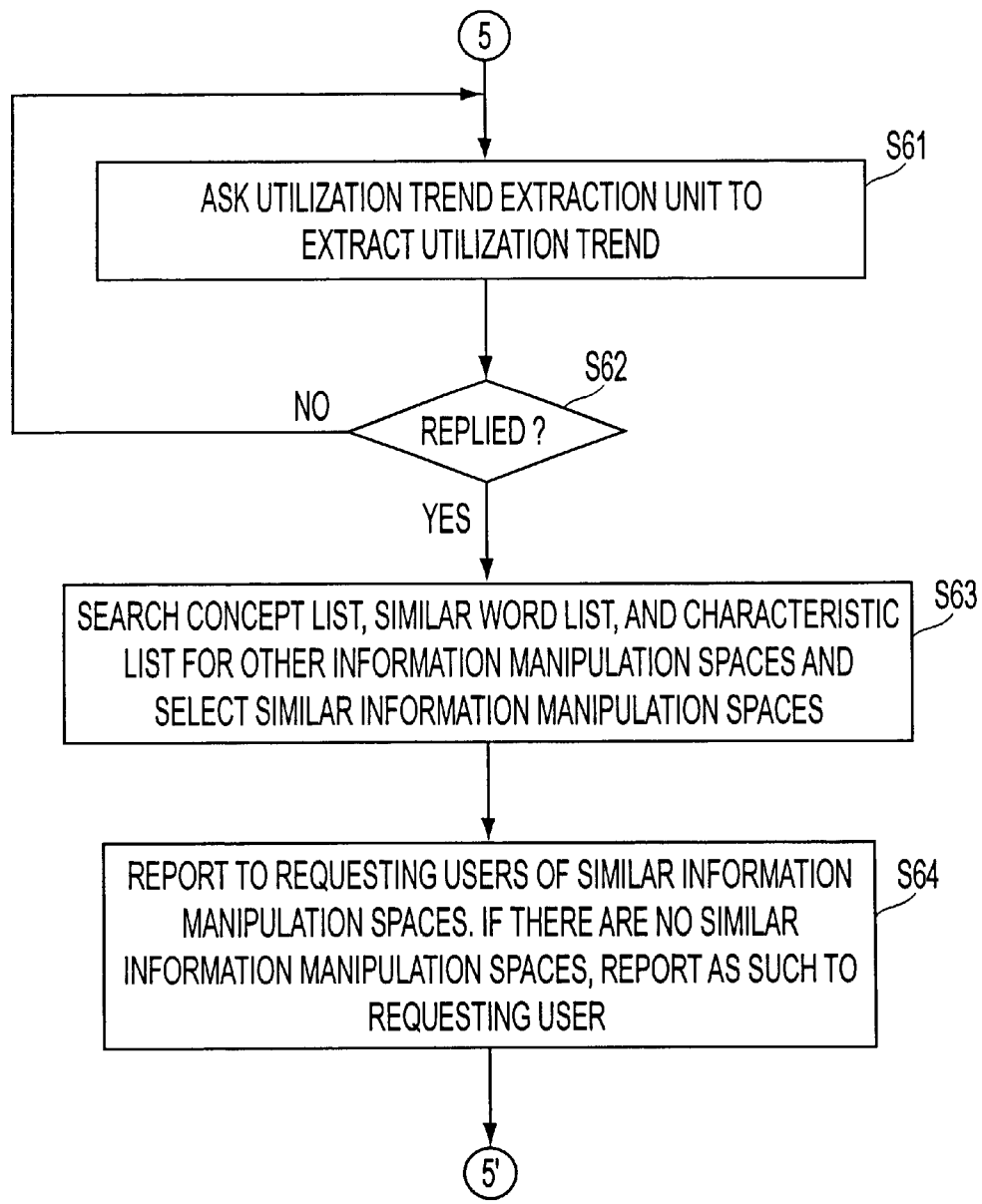
FIG. 16 is a flowchart showing the flow of processing of an information manipulation space matching unit in the preferred embodiment.

When the request is a matching search request, the information manipulation space matching search unit 110 is instructed to search for virtual electronic information manipulation spaces VMS in which similar utilization is being performed, as shown in FIG. 16 to be described later, and search results are sent to the information manipulation space control unit 202 of the user terminal equipment 200 through the communication unit 101 and the network 300. Then, control returns to step S11 which is waiting for a request.

Next, processing for a log-in request in the information manipulation space management unit 102 and the information manipulation space access right control unit 104 will be described with reference to the flowchart in FIG. 12.

The information manipulation space access right control unit 104, in step S21, determines whether the log-in request is for a new information manipulation space VMS or for continued use on a previous information manipulation space VMS.

When it is determined that the log-in request is for a new information manipulation space VMS, control proceeds to step S22, which determines whether the requesting user is a member registered in advance, and if so, confirms a charge payment method registered on the member.

Next, control proceeds to step S23, which creates a new information manipulation space VMS, and in the next step S24, information of the newly created information manipulation space VMS is sent to the requesting user. Then, control returns to step S11 of FIG. 11.

When it is determined in step S21 that the log-in request is for continued use, control proceeds to step S25, which checks the user ID (identification information) of the requesting user and a password first set by the user with respect to the requested information manipulation space VMS. The user ID and the password are contained in the log-in request.

As a result of matching the user ID with the password in step S25, it is determined whether the user is an authentic user having the right to gain access to the information manipulation space VMS. If not so, the log-in request is ignored and control immediately returns to step S11 of FIG. 11. If so, control proceeds to step S27, which newly generates and registers an encryption key and encrypts the information of the information manipulation space by the new encryption and sends the encrypted information to the user. By updating encryption information instead of using the same encryption information as used previously, information of the information manipulation space is safely sent to the user. Then, control returns to step S11 in FIG. 11.

Next, a description will be made of processing for an information reference request in the information manipulation space management unit 102 and the encryption unit 105 with reference to the flowchart in FIG. 13.

The information manipulation space management unit 102, in step S31, uses the number of an information manipulation space VMS to obtain an encryption key for the information manipulation space VMS from the information manipulation space management table 10 and passes it to the encryption unit 105 along with information requested for reference. In step S32, the encryption unit 105 performs encryption processing for the information by using the passed encryption key. Next, in step S33, the encrypted information is sent to the user terminal equipment 200 through the communication unit 101 and the network 300. Then, control returns to step S11 in FIG. 11.

Next, a description will be made of processing for a right processing request in the information manipulation space management unit 102 and the right processing unit 107 with reference to the flowchart in FIG. 14.

The information manipulation space management unit 102, in step S41, selects copyrighted materials used in the information manipulation space VMS from the copyrighted material management table 20 of the copyrighted material management unit 106. In the next step S42, the right processing unit 107 calculates the sum of charges for utilization of the selected copyrighted materials using the copyrighted material price table 30 and sends it to the user.

Since the user sends back information about whether to approve a levy as described previously, it is determined in step S43 whether approval of the user has been obtained. If so, control proceeds to step S44, which writes a share of each copyright holder's profit for the manipulated materials to the transaction status table record of the payment method management table 40 to collect charges from the user by a predetermined method. Then, control returns to step S11 in FIG. 11. When approval for the levy has not been obtained from the user, the right processing terminates and control immediately returns to S11 in FIG. 11.

Next, a description will be made of processing for a reference request in the information manipulation space management unit 102 and the similar information search unit 109 with reference to the flowchart in FIG. 15.

In step S51, the similar information search unit 109 asks the utilization trend extraction unit 108 to extract a utilization trend in the information manipulation space VMS. A reply for it is awaited in the next step S52, and upon receipt of a reply, control proceeds to step S53, which creates a search expression from a concept list, a similar word list, and a characteristic list to search for similar information.

In the next step S54, information searched for is sent to the user terminal equipment 200. In this case also, the information manipulation space management unit 102 asks the encryption unit 105 for encryption so that encryption specific to the information manipulation space VMS is applied to the information to be sent. Then, control returns to step S11 in FIG. 11.

Next, a description will be made of processing for a search request in the information manipulation space management unit 102 and the information manipulation space matching search unit 110 with reference to the flowchart in FIG. 15.

In step S51, the information manipulation space matching search unit 110 asks the utilization trend extraction unit 108 to extract a utilization trend in the information manipulation space VMS. A reply for it is awaited in the next step S62, and upon receipt of a reply, control proceeds to step S63, which creates a search expression from a concept list, similar word list, and characteristic list to search for a similar information manipulation space VMS.

In the next step S64, if there is a similar information manipulation space VMS, the fact is reported to both users of the information manipulation spaces VMS. if there is no similar information manipulation space VMS, the fact is reported to the requesting user. Then, control returns to step S11 in FIG. 11.

Figure 17:
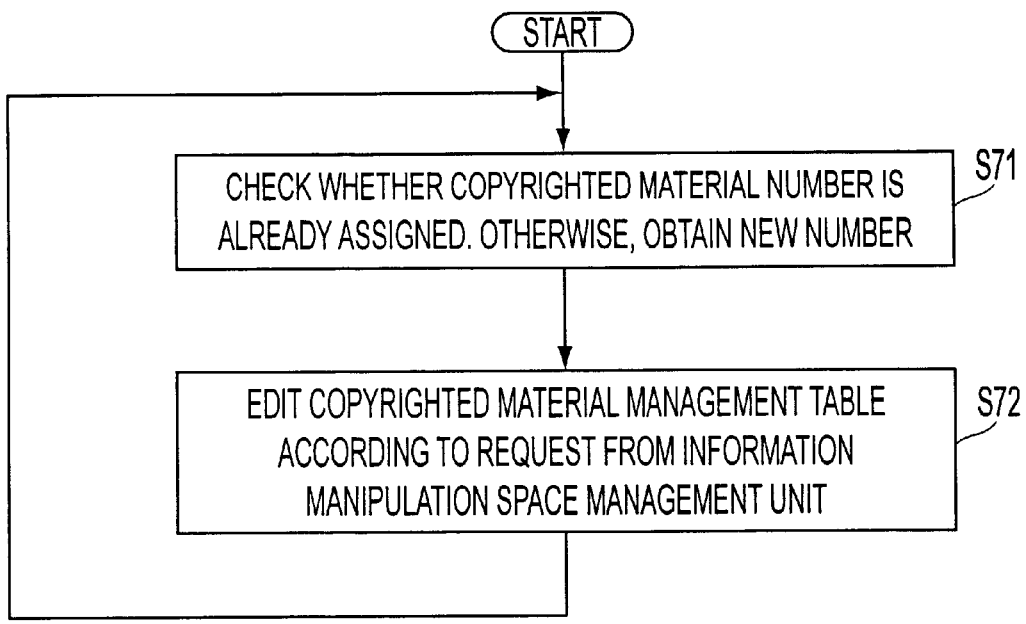
FIG. 17 is a flowchart showing the flow of processing of a copyrighted material management unit in the preferred embodiment.

Next, a description will be made of processing of the copyrighted material management unit 106 of the information manipulation space server 100 with reference to FIG. 17.

In step S71, it is checked whether copyrighted material numbers are already assigned to copyrighted materials. If not so, new copyrighted material numbers are obtained.

Next, control proceeds to step S72, which edits the copyrighted material management table 20 based on a request from the information manipulation space management unit 102.

Figure 18:
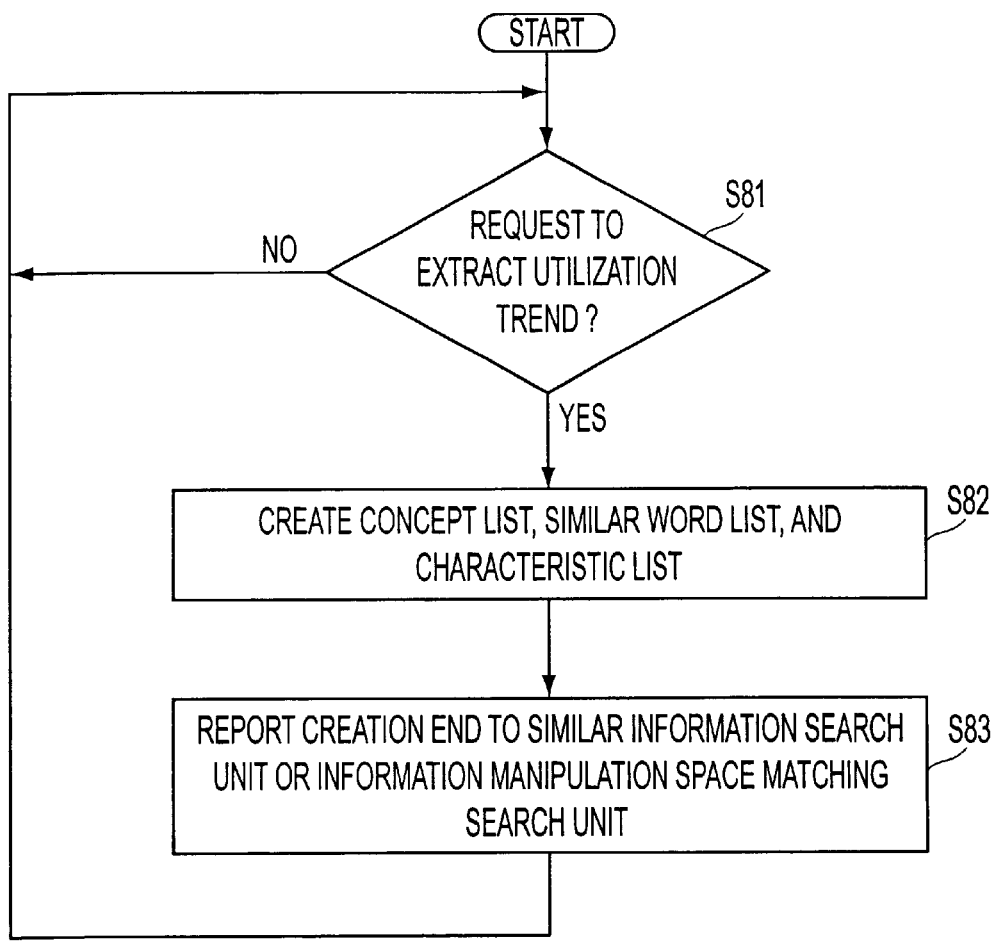
FIG. 18 is a flowchart showing the flow of processing of a utilization trend extraction unit in the preferred embodiment.

Next, a description will be made of processing of the utilization trend extraction unit 108 of the information manipulation space server 100 with reference to FIG. 18.

In step S81, the utilization trend extraction unit 108 waits for a utilization trend extraction request from the similar information search unit 109 or the information manipulation space matching search unit 110, and if a utilization trend extraction request arrives, proceeds to step S82 to create a concept list, a similar word list, and a characteristic list. In step S83, creation end is reported to the requesting similar information search unit 109 or the information manipulation space matching search unit 110.

Figure 19:
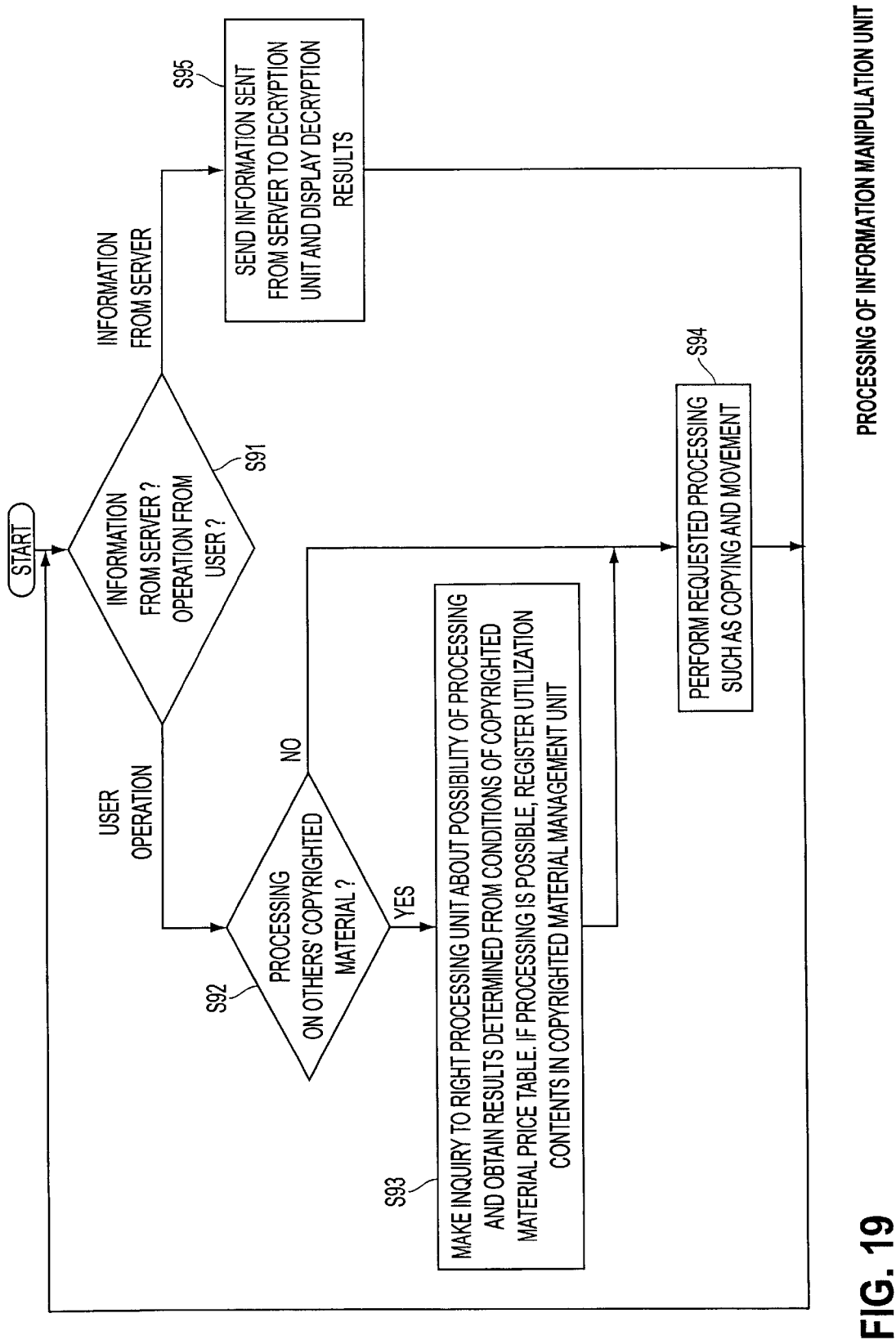
FIG. 19 is a flowchart showing the flow of processing of an information manipulation space control unit in the preferred embodiment.

Next, a description will be made of the operation of the information manipulation unit of the user terminal equipment 200 with reference to FIG. 19.

It is determined in step S91 whether information from the server 100 is obtained or the user inputs an operation. For the user's operation input, control proceeds to step S92, which determines whether the inputted operation is about others' copyrighted materials.

For an operation on others' copyrighted materials, an inquiry about the possibility of processing (utilization) is made to the right processing unit 107 of the server 100, and information containing a result of judgment from conditions of the copyrighted material price table is obtained. If processing is possible, information on a utilized copyrighted material is registered in the copyrighted material management unit 103.

Control proceeds to step S94. If it is determined in step S92 that the inputted operation is not on others' copyrighted materials, control proceeds directly to step S94 without going through step S93. In the step S94, a user-requested operation such as copying or movement is performed.

On the other hand, when it is determined that information from the server 100 is received, control proceeds to step S95, which sends the information sent from the server 100 to the decryption unit 204 to decrypt the information and displays the decrypted information. After steps S94 and S95, control returns to step S91.

Figure 20:
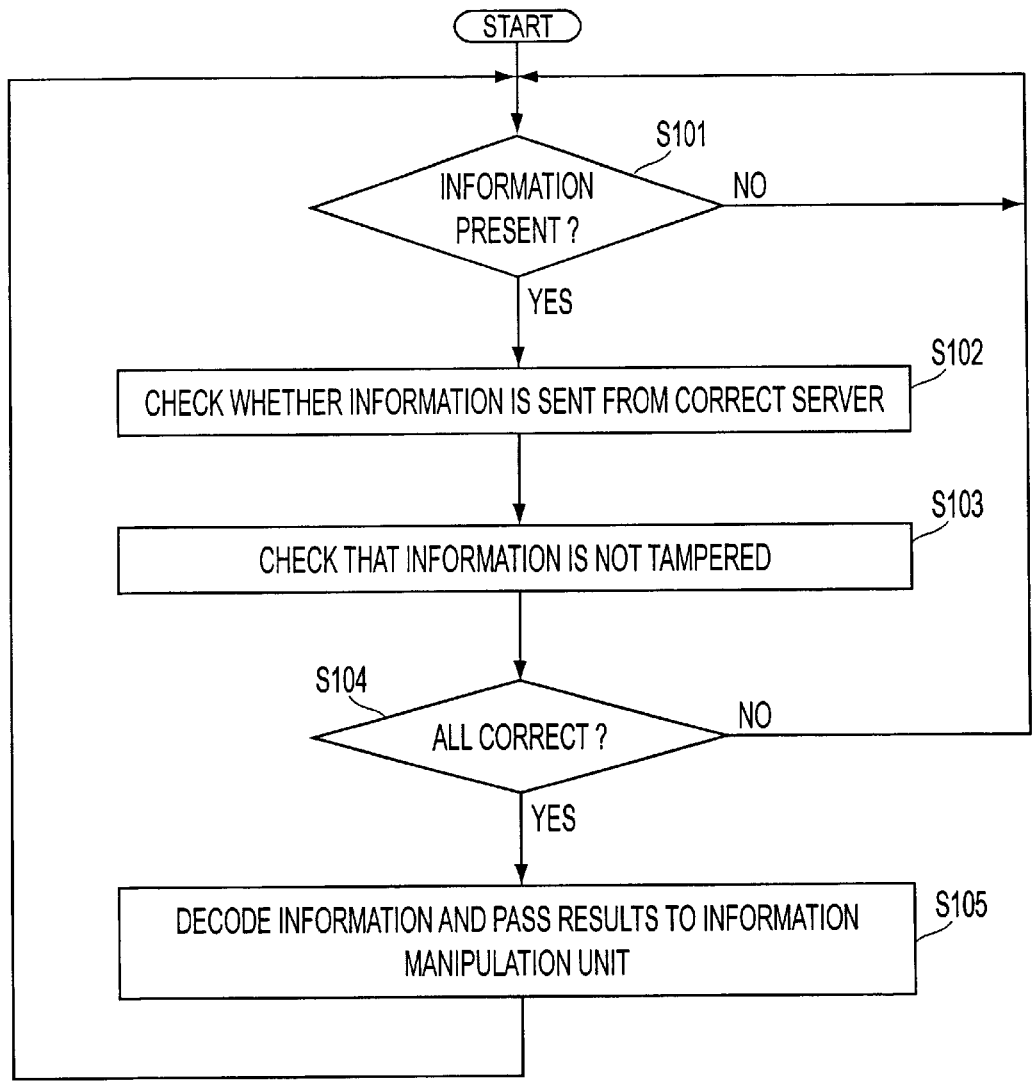
FIG. 20 is a flowchart showing the flow of processing of an decryption unit in the preferred embodiment.

The decryption unit 204 performs decryption processing as shown in FIG. 20. In step S101, information to be decrypted is awaited, and control proceeds to step S102 if information to be decrypted exists. In step S102, it is checked whether the information is correct information sent from the server 100. In the next step S103, it is checked that the information is not tampered. In the next step S104, it is determined whether the information is correct as a result of the checking in steps S102 and S103. For incorrect information, without decrypting it, control is returned to step S101.

When it is determined in step S104 that the information is correct, control proceeds to step S105, which decrypts the information and returns the decrypted information to the information manipulation unit 203. Control returns to step S101.

Figure 21:
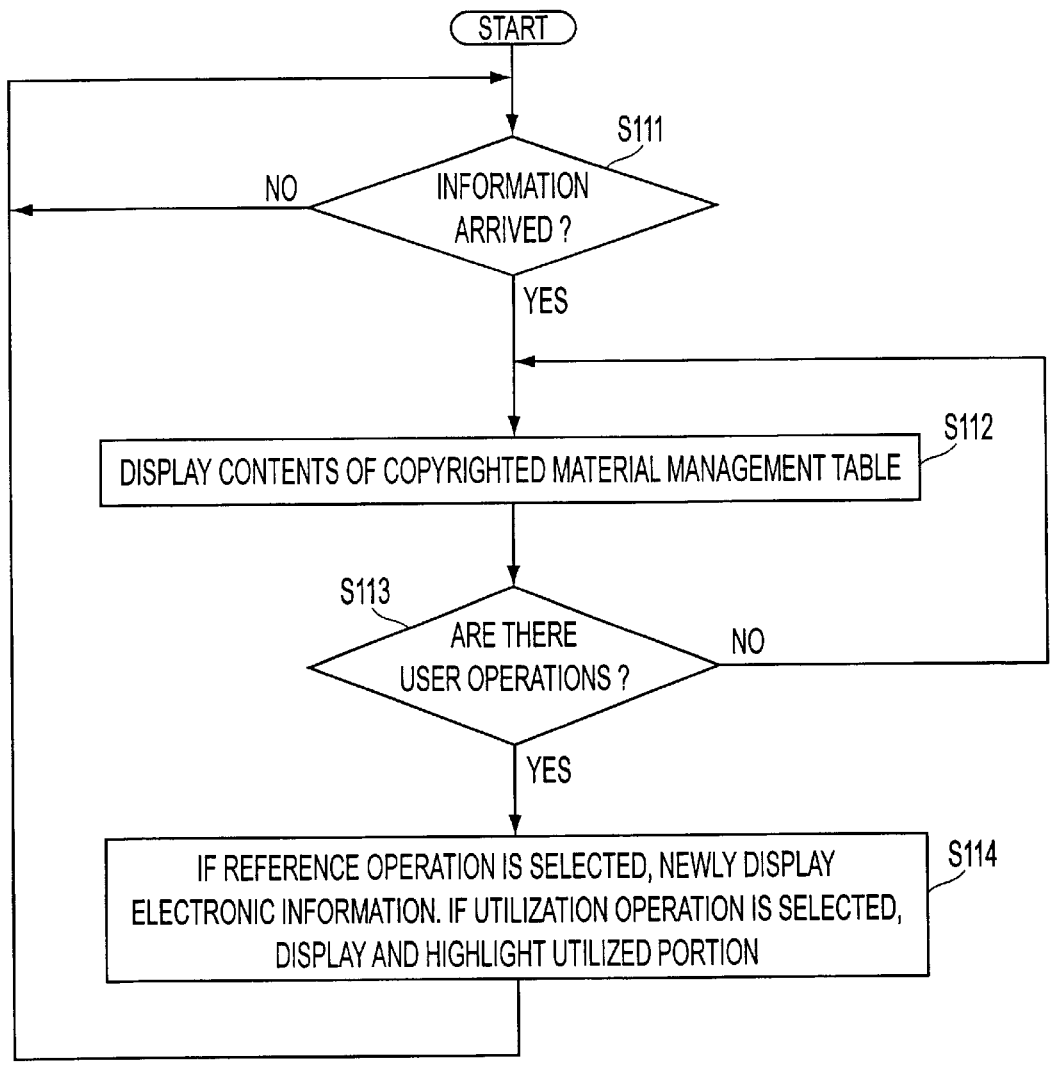
FIG. 21 is a flowchart showing the flow of processing of a utilization and reference list unit in the preferred embodiment.

Next, a description will be made of processing of the utilization and reference list unit 205 of the user terminal equipment 200 with reference to the flowchart in FIG. 21.

In step S111, information from the server 100 is awaited. Upon arrival thereof, control proceeds to step S112 to display the contents of the copyrighted matter management table 20. In the next step S113, it is determined whether the user inputs an operation, and if not so, control returns to step S112 without changing the display status.

As described above, as a result of processing in the utilization and reference list unit 205, copyrighted materials already used in manipulated materials are notationally changed for differentiation from others in the list of others' copyrighted materials. This will facilitate selection of other copyrighted materials for further utilization or the reuse of the same.

In the case of user's operation input, if the selected operation is reference, the electronic information is displayed again. If the selected operation is utilization, a portion currently being utilized is highlighted in the copyrighted material management table for the sake of clarity. Then, control returns to step S111.

As has been described above, an electronic information utilization promotion system of a preferred embodiment of the present invention makes it possible to separately perform use right processing for mere viewing and listening of information and utilization right processing for utilization in users' own works, and can perform right processing according to a utilization level. Therefore, copyrighted materials can be captured in a new work for utilization, so that distribution of knowledge is accelerated.

The electronic information utilization promotion system also makes it possible to perform only use right processing for information being manipulated, without performing utilization right processing, that is, right processing until the manipulated information is released, thus reducing useless right processing in the process of creation and efforts to negotiate singly with an author for right processing.

The information manipulation space server 100 must include the communication unit 101, information manipulation space management unit 102, information manipulation space information accumulation unit 103, information manipulation space access right control unit 104, encryption unit 105, copyrighted material management unit 106, and right processing unit 107, while the utilization trend extraction unit, similar information search unit, and information manipulation space matching search unit need not be included in the server 100.

Although, in the above-mentioned embodiment, the server 100 and the user terminal equipment 200 are separated, an electronic information utilization promotion system of the present invention is also applicable in the case where they are configured in one workstation.

Although, in the above-mentioned embodiment, an information manipulation part is installed in advance as software in a personal computer as user terminal equipment, a software application for the information manipulation part may be afforded for installation only to users authorized by the information manipulation space access right control part as legitimate users accessible to virtual electronic information manipulation spaces.

As has been described above, according to an electronic information utilization promotion system of the present invention, use such as browsing and utilization for manipulation can be separated. In other words, even if information captured in a virtual electronic information manipulation space has been manipulated, so long as the manipulated information is not transferred out of the space, right processing does not occur for utilization for the manipulation, the information being only used. Since materials produced as a result of manipulation processing are subjected to right processing by the right processing part, efforts to negotiate singly with copyright holders can be reduced.

As a result of smooth execution of right processing, further distribution as new copyrighted materials becomes easy, so that utilization of electronic information can be further promoted.

By encrypting information transmitted over virtual electronic information manipulation spaces, illegal utilization by malicious third persons can be prevented.

What is claimed is:

1. An electronic information utilization promotion system, comprising:
    an information manipulation space management part that manages virtual electronic information manipulation spaces created on a network;
    an information manipulation space information accumulation part that accumulates information within said virtual electronic information manipulation spaces;
    an information manipulation space control part that presents said virtual electronic information manipulation spaces to users while communicating with said information manipulation space management part over said network and obtains information managed by said information manipulation space management part by users' operations;
    an information manipulation part that manipulates information in said virtual electronic information manipulation spaces; and
    a right processing part that performs right processing when information is transferred out of said virtual electronic information manipulation spaces.

2. The electronic information utilization promotion system of claim 1,
    wherein said information manipulation space management part, said information manipulation space information accumulation part, said copyrighted material management part, and said right processing part are included in an information manipulation space server;
    wherein said information manipulation space control part and said information manipulation part are included in user terminal equipment; and
    wherein said information manipulation space server and said user terminal equipment each include a communication part to perform communications over said network.

3. The electronic information utilization promotion system of claim 1, further comprising:
    a copyrighted material management part that manages others' copyrighted materials used for reference or manipulation in said virtual electronic information manipulation spaces,
    wherein said right processing part references information of said copyrighted material management part to perform right processing when information is transferred out of said virtual electronic information manipulation spaces.

4. The electronic information utilization promotion system of claim 1, further comprising an information manipulation space access right control part that confirms that a user to gain access to said virtual electronic information manipulation spaces is a legitimate user, before permitting the user said access.

5. The electronic information utilization promotion system of claim 2,
    wherein said information manipulation space server includes an encryption part that encrypts information managed by said information manipulation space management part when it is transferred to said information manipulation space control part of said user terminal equipment over said network; and
    wherein said user terminal equipment includes a decryption part that decrypts information encrypted by said encryption part that is sent from said information manipulation space server.

6. The electronic information utilization promotion system of claim 5, wherein said encryption part uses an encryption method which, during encryption, changes an encryption key for each of said virtual electronic information manipulation spaces.

7. The electronic information utilization promotion system of claim 1, further comprising a utilization and reference list part that presents a list of others' copyrighted materials in said virtual electronic information manipulation spaces.

8. The electronic information utilization promotion system of claim 7,
wherein, of the copyrighted materials presented by said utilization and reference list part, those used in manipulated materials are notationally changed in said list so that their locations in the list are identified.

9. The electronic information utilization promotion system of claim 1, further comprising:
a utilization trend extraction part that extracts the trend of copyrighted materials utilized or referenced previously in said virtual electronic information manipulation spaces; and
a similar information search part that searches for similar information based on information extracted by said utilization trend extraction part.

10. The electronic information utilization promotion system of claim 9, further comprising:
an information manipulation space matching part that introduces users in similar or mutually complementary virtual electronic information manipulation spaces based on the characteristics of each virtual electronic information manipulation space extracted by said utilization trend extraction part.

11. The electronic information utilization promotion system of claim 1, wherein partial utilization of a copyrighted material is limited based on previously registered information indicating whether utilization of a selected part of said copyrighted material is permitted.

12. The electronic information utilization promotion system of claim 2, wherein said information manipulation part is installed in advance as software in each user's terminal equipment.

13. The electronic information utilization promotion system of claim 3, wherein said information manipulation part is set for users who are authorized to gain access to said virtual electronic information manipulation spaces by said information manipulation space access right control part.

* * * * *